Figure 1:
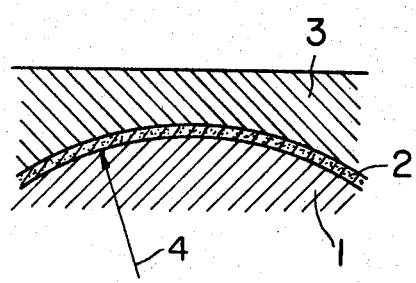

United States Patent [19]
Takemura et al.

[11] 3,723,239
[45] Mar. 27, 1973

[54] RUBBER LAMINATES AND A PROCESS FOR PRODUCING THE SAME

[75] Inventors: Satoshi Takemura; Eiichi Yoshino; Toshio Honda; Eishi Kubota; Yukio Fukuura, all of Tokyo, Japan

[73] Assignee: Bridgestone Tire Company Limited, Tokyo, Japan

[22] Filed: Feb. 19, 1971

[21] Appl. No.: 117,020

[30] Foreign Application Priority Data

Feb. 23, 1970 Japan..................................45/14762

[52] U.S. Cl. ................161/170, 117/76, 117/138.8, 117/145, 161/187
[51] Int. Cl. .........................B32b 5/10, D04h 3/12
[58] Field of Search.......161/187; 117/76 T, 138.8 F, 117/145

[56] References Cited

UNITED STATES PATENTS

| | | | |
|---|---|---|---|
| 2,346,440 | 4/1944 | Lessig et al............................161/187 |
| 2,502,406 | 3/1950 | Entwistle ..............................117/76 T |
| 3,060,078 | 10/1962 | Atwell..................................117/76 T |
| 3,387,996 | 6/1968 | Tolliver...............................117/76 T |
| 3,431,161 | 3/1969 | Vecellio..............................117/76 T |
| 3,460,973 | 8/1969 | Hantzer et al.......................117/76 T |
| 3,538,972 | 11/1970 | Yurcick et al.......................161/187 |

*Primary Examiner*—Morris Sussman
*Attorney*—Stevens, Davis, Miller & Mosher

[57] ABSTRACT

A laminate of rubber with a polymeric mono-filament having a large curvature radius of the cross-section or a cord formed by twisting said mono-filaments or the organic polymeric film is prepared by using an aqueous adhesive consisting of a mixture of a liquid adhesive base consisting mainly of a solution of a polyhydric phenol polysulfide having the general formula

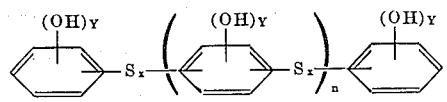

wherein $x$ represents an integer of 2 to 8 and $x$ in each $S_x$ is not always the same integer, Y represents an integer of 2 to 3 and $n$ represents 0 or an integer of 1 to 15, dissolved in a resorcin excess resorcin-formaldehyde condensate and RFL solution consisting of a resorcin-formaldehyde resin obtained by reacting resorcin and formaldehyde and a rubber latex.

2 Claims, 2 Drawing Figures

RUBBER LAMINATES AND A PROCESS FOR PRODUCING THE SAME

The present invention relates to laminates of fibers or a film and a rubber, more particularly rubber laminates obtained by vulcanizing a rubber in which fibers having a large curvature radius in the cross-section or a film, which have been subjected to a particular adhering treatment, are embedded and a process for producing the same.

It has been well known that fibers having a small curvature radius in the cross-section, that is, multi-filaments are used as the fibers for reinforcing rubber laminates, such as tire and belt. For example, a plurality of raw yarns bundling a large number of filaments having 1 to 8 deniers are twisted for a tire cord. In this case, the curvature radius of cross-section of the filament yarn in nylon-6 is about 0.0005 to 0.0016 cm. When the filament yarn is assumed to be circular, the curvature radius of the cross-section is shown by the following formula $$r = (1/3 \times 10^2) \sqrt{D/10\pi \times \rho}$$

wherein $r$ is the curvature radius of the cross-section, $D$ is the denier, $\rho$ is the specific gravity of the fiber and $\pi$ is the circular constant of 3.14.

In this case, the raw yarn is generally referred to as "multi-filament" and for example, there are the following fibers for tire.

Polyethylene terephthalate: 1,000D/192f/3. (The raw yarn having 1,000 deniers is formed by bundling 192 filaments, each having 5.2 deniers and three raw yarns are twisted to form a cord.)

Polyethylene terephthalate: 1,000D/250f/3. (One filament is 4 deniers.)

Nylon: 840D/140f/2, 1,260D/210f/2. (One filament is 6 deniers.)

Rayon: 1,650D/1,100f/2. (One filament is 1.5 deniers.)

The fibrous materials having a large curvature radius of cross-section, for example, a mono-filament having a large curvature radius have not been generally used for the fibrous materials for reinforcing rubbers instead of the above described multi-filaments and the films have never been used. Because, the mono-filament having a large curvature radius of cross-section and the film having an infinite curvature radius are more stiff and less flexible and are much more difficult in the adhesion to a rubber than the multi-filaments.

However, according to the present invention these materials can be used as the reinforcing materials in the production of rubber articles, such as tire, belt, air cushion, rubber hose and the like. The term "rubber" used herein means all natural and synthetic rubbers, which are generally called "rubbery elastic polymers." Particularly, these rubbery elastic polymers mean a rubber selected from the group consisting of ordinarily used rubbers, such as natural rubber, styrene-butadiene copolymer rubber, butadiene-acrylonitrile copolymer rubber, polybutadiene rubber, polyisoprene rubber, isoprene-isobutylene copolymer rubber, polychloroprene rubber and the like or compositions of blends of two or more of these rubbers.

In reinforcement of a rubbery article with the above described high polymeric material, a sufficient adhesion between the rubber and the high polymeric material is required to endure a periodic large deformation subjected to rubber articles in the use.

Polyesters represented by polyethylene terephthalate have high tensile strength and modulus and excellent heat resistance and waterproof and therefore they are one of the most preferable materials for reinforcing rubber but they are difficult in adhesion to rubber.

In general, multi-filament fibers, such as regenerated cellulose fiber, polyamide fiber, polyvinyl alcohol fiber and the like are used as fibers for reinforcing rubber articles but these fibers can be adhered to rubber sufficiently only by treating with a known liquid adhesive referred to as "RFL."

RFL is a liquid obtained by mixing an aqueous solution of primary polycondensate of resorcin with formaldehyde and a rubber latex and as the rubber latex use may be made of styrene-butadiene copolymer rubber latex, natural rubber latex, vinylpyridine-styrene-butadiene copolymer rubber latex and the like. As the catalyst for reaction of resorcin and formaldehyde, use may be made of basic substances, such as sodium hydroxide, potassium hydroxide, ammonium hydroxide and the like. The details have been described in M.I. Dietrick, Rubber World, 136, No. 6, P. 847, (1957) and D. Boguslavski, Soviet Rubber Technology No. 1, P. 4, (1959) (published by The Research Association of British Rubber Manufactures).

However, even in the polymeric materials, such as regenerated cellulose, polyamide, polyvinyl alcohol, etc., when they are the fibers having a large curvature radius in the cross-section or films, even if they are treated with the above described RFL, the adhesion to a rubber is very difficult. The polyesters cannot be satisfactorily adhered to a rubber even in the case of multi-filaments.

Accordingly, a special consideration has been paid to adhesion of a polyester multi-filament fiber to a rubber. For example, in British Patent No. 816,640 polyester multi-filament fiber is coated with a solution of polyisocyanate in an organic solution and then dried and further treated with RFL and dried. In Japanese Patent No. 486,096 (filed on Nov. 16, 1961 by the Goodyear Tire and Rubber Company, U.S. Priority Date: Jan. 27, 1961), polyester fiber is treated with a solution of an epoxy compound in an organic solvent and again with RFL. However, in these processes the adhesion of the polyester multi-filament fibers to the rubber is low and the fibers having the large curvature radius or the films have little adhesion to the rubber.

Furthermore, in these methods the use of organic solvents has dangers of inflammability and poison and it is troublesome and inefficient to repeat the treatment and drying two times. In production of rubber articles, it is important to obtain a satisfactory adhesion by one step without effecting two step treatments in order to increase productivity and to enable to use a safe and harmless water for a medium of the components of the adhesive.

The object of the present invention is to provide laminates composed of the rubber and the fibrous filaments having a large curvature radius or films, which are composed of organic polymers, such as polyesters, polyamides, polyvinyl alcohols, regenerated cellulose and the like.

The other object of the present invention is to provide laminates wherein the above described fibrous materials having a large curvature radius or a film are tightly adhered to the rubber by means of a special adhesive.

A further object of the present invention is to provide laminates composed of the fibrous filaments having a large curvature radius or the film and the rubber by means of an adhesive developing a strong adhesion only by one step treatment and having an excellent storage stability and no poison and inflammability, which is easy in handling and metering, high in shipping efficiency in a high concentration.

The reason why the conventional adhesives and adhering processes do not give an excellent result in the adhesion of the fibrous filaments having a large curvature radius or the films to the rubber will be considered as follows:

Namely, in the case of the multi-filament fibers, very fine filaments are bundled and consequently the adhesive penetrates into the interior of the multi-filament fibers through the spaces between the multi-filaments. In other words, since the multi-filament fibers act as a porous material to the adhesive, the adhesive penetrates into the fine pores and develops an anchor effect-like mechanical adhesion and this contributes considerably to the adhesion between the multi-filament fibers and the adhesive and increases the apparent adhesion in the adhesion test. However, in the case of the fibrous filament having a large curvature radius, the filament is used without twisting together two or more or by twisting a small number of filaments and therefore the space density of the above described fine pores is extremely few.

Accordingly, such a filament or film does not substantially contributes the mechanical adhesion and consequently the adhesion of such a material to a rubber is difficult.

Consequently, when the fibrous filament having a large curvature radius or the film is used for reinforcing rubber articles, an adhesive which can actually chemically adhere these materials, is needed.

A component of the adhesive to be used in the present invention dissolves or swells the surface of the filament or the film and diffuses therein in a heat treatment at a high temperature and the primary chemical bond, hydrogen bond and secondary bond are formed in a unit of molecular order, so that the real adhering relation is established and such a material is integrated with a rubber strongly and the object of the present invention can be accomplished.

The inventors have made various investigations and found that polyhydric phenol polysulfides are particularly effective to the fibrous filaments having a large curvature radius or the films, which are composed of organic polymers, such as polyesters, polyamides, polyvinyl alcohols, regenerated cellulose and the like, in addition to said organic polymer multi-filaments having a small curvature radius and that the adhesive consisting mainly of the polyhydric phenol polysulfides can adhere these materials to the rubber strongly with only one step treatment.

It has been confirmed that this adhesive can develop a higher effective for the mono-filament having various shapes and more than 10 deniers, the curvature radius of which is more than $(1/300) \times \sqrt{1/(3.14 \times \rho)}$ cm, wherein $\rho$ shows the specific gravity of the fibrous filament, for example, nylon-6 is 1.14 g/cm$^3$, polyethylene terephthalate is 1.38 g/cm$^3$, rayon is 1.52 g/cm$^3$ and polyvinyl alcohol is 1.28 g/cm$^3$, and for the film having an infinite curvature radius, as compared with the other adhesives. The cross-section of the mono-filament includes various forms, such as circular, elliptic, rectangular and hollow forms.

The organic polymeric materials having fiber-forming ability or film-forming ability, which can be applied with the adhesive of the present invention, are mono-filaments having a large curvature radius and films, which are composed of linear polyamides, polyesters, polyvinyl alcohols, regenerated cellulose and the like and the applicable scope is very broad. Of course, the adhesive can be applied to multi-filaments.

The term "polyhydric phenols" used herein means phenols having at least two hydroxyl groups per one benzene ring, for example, hydroxyquinone, resorcin, orcinol, pyrogallol, pyloroglucinol, pyrocatechin and the like. Polysulfides of these polyhydric phenols are compounds having a relatively complicated configuration, which have sulfur atom chains between benzene rings of the phenol and the effective sulfides according to the present invention have two or more sulfur atoms in the sulfur chains and are shown by the following formula

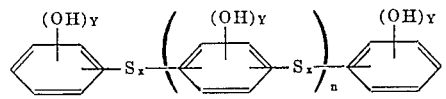

wherein $x$ represents an integer of 2 to 8 and $x$ in each $S_x$ is not always the same integer, Y represents an integer of 2 to 3 and $n$ is 0 or an integer of 1 to 15. In crude polyhydric phenol polysulfides obtained by synthesis, the above described $x$ and $n$ have some distributions and single compound is hardly obtained but according to the present invention, the crude polyhydric phenol polysulfides can be used.

These compounds can be produced by various methods and for example by reacting the above described polyhydric phenols with sulfur chloride in a solvent inert for sulfur chloride. The most preferable polyhydric phenol polysulfide is resorcin polysulfide, because resorcin is scarcely oxidized in air and is stable.

The polyhydric phenol polysulfides are obtained in various forms from a highly viscous semisolid state to a bulky powdery state depending upon the conditions in the synthesis reaction but any state is very difficult in handling.

As liquid adhesive base, it is desirable that said base is fluid, metering, shipping and storage are easy and degradation is not caused for a long period of time.

Accordingly, it is considered to dissolve the polyhydric phenol polysulfide in an organic solvent but the use of organic solvent is very undesirable in view of inflammability and poison.

The polyhydric phenol polysulfides are poorly dissolved in an acidic and neutral water but is relatively readily dissolved in an alkaline water. However, in general, polyhydric phenols are considerably oxidized in air at an alkaline side and the degradation and coloration are significant, so that the dissolution in an alkaline water is not preferable.

The inventors have made many investigations for means to dissolve the polyhydric phenol polysulfides without affecting adversely the adhesion of the monofilaments having a large curvature radius or the films to a rubber and to obtain a liquid adhesive base and found that the polyhydric phenol polysulfides are easily dissolved in resorcin-formaldehyde condensate containing an excess amount of resorcin.

The term "resorcin-formaldehyde condensate containing an excess amount of resorcin" (abridged as resorcin excess resorcin-formaldehyde condensate hereinafter) used hereinafter means one obtained by reacting resorcin with formalin containing formaldehyde of less than equimole based on resorcin, which is a liquid showing fluidity at room temperature, if 30 – 40 percent formalin is used. The amount of formaldehyde is preferred to be 0.10 to 0.75 mole based on 1.0 mole or resorcin. Beyond this range the fluidity decreases and such an amount is not preferable. For the reaction an acidic and basic catalyst may be used but the reaction can be sufficiently completed only by heating without using any catalyst. Rather, it is preferable not to use any catalyst. For example, resorcin is melted by heating up to about 120° C and formaldehyde is added dropwise thereto while maintaining this temperature. After the addition, the resulting mixture is stirred for about 30 minutes to complete the reaction.

The thus obtained resorcin excess resorcin-formaldehyde condensate is a yellow clear fluid. By dissolving a given amount of the polyhydric phenol polysulfides in such resorcin excess resorcin-formaldehyde condensate, the liquid adhesive base to be used in adhesion of a mono-filament having a large curvature radius or a film to rubber can be obtained. In this case, the polyhydric phenol polysulfide may be dissolved directly in resorcin excess resorcin-formaldehyde condensate, while in order to avoid a troublesome operation for scraping out the polyhydric phenol polysulfide from the reaction vessel, the polyhydric phenol polysulfide is once dissolved in a suitable organic solvent, for example, methanol and the resulting solution is discharged from the reaction vessel and added to the above described resorcin excess resorcin-formaldehyde condensate and then methanol is completely removed under a reduced pressure to obtain a homogeneous orangy yellow clear fluid liquid.

The amount of resorcin excess resorcin-formaldehyde condensate is preferred to be 200 to 1.0 parts by weight per 1.0 part by weight of the polyhydric phenol polysulfide (part means part by weight hereinafter). If the amount is too large, the adhesion lowers, while if the amount is too small, the solubility decreases and the viscosity increases and the handling is difficult. In resorcin excess resorcin-formaldehyde condensate, water contained in formalin and water due to the condensation reaction are incorporated in a small amount but the presence of such a small amount of water is warrantable to the object of the present invention. However, a too large amount of water decreases the solubility to the polyhydric phenol polysulfide and reduces the substantial concentration and is not preferable. The amount of water should be adjusted to less than 25 percent of the whole resorcin-formaldehyde condensate. The thus prepared liquid adhesive base of the present invention is fluid at room temperature and is kept under a weakly acidic condition in the presence of resorcin, so that the liquid adhesive base is very stable against oxidation owing to oxygen in air and can be storaged for a long period of time. Furthermore, inasmuch as low molecular weight volatile organic solvents are not contained, there is no inflammability and poison and since the substantial concentration is high, the shipping efficiency is high and since there is fluidity, the handling and metering are easy.

Then an explanation will be made with respect to a process for applying the liquid adhesive base of the present invention to adhesion of the mono-filament having a large curvature radius or the film to a rubber.

It is preferable to use the liquid adhesive base after diluted with water prior to treatment of the fibrous material or film. However, as mentioned above, the liquid adhesive base contains a component, which is not completely dissolved in a neutral water, and therefore pH in water is increased by adding an appropriate amount of basic substance to water, whereby the liquid adhesive base is completely dissolved. As the basic substances, use may be made of hydroxides of alkali metals, such as sodium hydroxide, potassium hydroxide and the like; ammonium hydroxide; organic amines, such as monomethyl amine, monoethyl amine, monopropyl amine, etc., pH of the diluting water must be more than 9.0. The most preferable basic material is ammonium hydroxide.

The liquid adhesive of the present invention is prepared by mixing the diluted above mentioned liquid adhesive base with RFL.

With the thus obtained liquid adhesive, the mono-filament having a large curvature radius or the film is treated and dried.

The temperature of the drying and heat-treatment in this case is preferred to be higher than 120° C, particularly higher than 170° C. The time of the heat-treatment is preferred to be about 30 seconds to about 30 minutes and the higher the temperature of the heat treatment, the shorter the time is, but these conditions are previously determined depending upon the material to be adhered. For example, polyethylene terephthalate film is heat-treated at 240° C for about 2 to 6 minutes. The thus treated materials are embedded in an unvulcanized rubber containing a vulcanizing agent and the vulcanization is effected, thereby the mono-filament or the film is adhered to a rubber very tightly. The vulcanization condition is determined depending upon the vulcanization rate of the compounding rubber and in general, the vulcanization temperature is 131 – 180° C and the time is 10 minutes to 2 hours.

The processes for treating the mono-filament having a large curvature radius or the film with the liquid adhesive may be carried out by various means. For example, the materials are immersed in the liquid adhesive and taken up and then the excess amount of liquid adhesive is squeezed out, or the liquid adhesive is coated or sprayed on the materials.

The amount of solid component of the adhesive applied on the materials to be adhered is adjusted to 0.5 to 10 parts by weight per 100 parts by weight of the materials. When the amount is too small, the adhesion is low, while when the amount is too large, the adhesion does not increase in proportion to the increase of the adhesive.

The mixture ratio of each solid component of the liquid adhesive base and RFL is preferred to be 0.5 to 10.0 parts by weight of RFL per 1.0 part by weight of the liquid adhesive base and in both case when said ratio is too small and too large, the adhesion decreases. Particularly when said ratio is too small, latex is liable to be solidified and such an amount is not preferable. The particularly preferable amount is 0.8 to 3.0 parts.

A further explanation will be made with respect to RFL. The mole ratio of reaction of resorcin and formaldehyde is 1.0:1.0 to 1.0:7.0, preferably 1.0:1.4 to 1.0:3.0. The ratio of solid content of rubber latex to resorcin-formaldehyde resin is 100:1 to 100:35, preferably 100:10 to 100:25. As the catalyst for condensation of resorcin and formaldehyde, use may be made of basic substances, such as hydroxides of alkali metals, for example sodium hydroxide, potassium hydroxide, etc., ammonium hydroxide, methyl amine, piperazine, urea, thiourea, etc. The amount is adjusted so that pH of RFL is 7.5 to 12.0, preferably 8.5 to 11.0. Furthermore, the above condensation is promoted by the action of potassium hydroxide, sodium hydroxide, ammonium hydroxide, etc., which have been added as a stabilizer for the latex, even if such catalyst is not particularly added. The total solid content of the adhesive of the present invention, which is composed of the above described liquid adhesive base and RFL, is preferred to be adjusted between 1 percent and 25 percent, more preferably 10 to 20 percent. If the concentration is too high, the latex in RFL is liable to solidify and such a concentration is not preferable.

As rubber latex, use may be made of natural rubber latex and synthetic rubber latex, such as styrene-butadiene copolymer rubber latex, styrene-vinyl pyridine-butadiene copolymer rubber latex, and the like. When rubbers to be adhered are ordinarily used rubbers, such as natural rubber, styrene-butadiene copolymer rubber, polybutadiene rubber, polyisoprene rubber, etc., at least one of any above described rubber latexes may be used. In general, the kind of rubber latex is determined depending upon the kind of rubber to be adhered. For example, when acrylonitrile-butadiene copolymer rubber is to be adhered, the use of said rubber latex is acceptable.

It will be contemplated to use polysulfides of phenol or alkylphenols, such as phenol, cresol, xylenol, p-tert.butylphenol, but they have no effect. Presumably this is because these polysulfides are lower in reactivity to resorcin-formaldehyde resin than polyhydric phenol polysulfides but the reason is not yet clear.

Moreover, the demerit of the polysulfides of phenol or alkylphenols, is that these polysulfides have no or very poor solubility to an alkaline water and they are not suitable for the object of the present invention.

Figure 2:
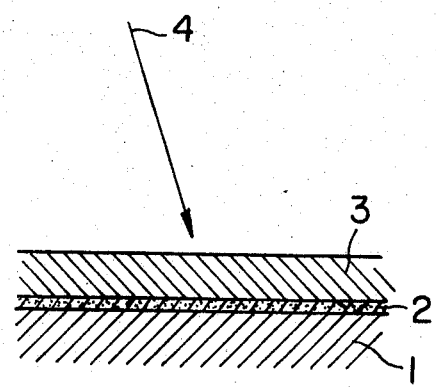

For a better understanding of the invention, reference is taken to the accompanying drawings, wherein:

FIG. 1 shows a cross-section of the adhered portion of a fibrous mono-filament having a large curvature radius of the cross-section and a rubber; and FIG. 2 shows a cross-section of the adhered portion of a film and a rubber.

The following examples are given in illustration of this invention and are not intended as limitations thereof. The percentage and part used herein mean by weight.

EXAMPLE 1

In a flask 55 parts of resorcin was dissolved in 500 parts of ethyl ether and 34 parts of sulfur monochloride was added dropwise thereto gradually over 3 hours at 25° C while stirring. The generated gaseous hydrochloric acid was passed slowly to a gas washing bottle containing a diluted ammonia water by an aspirator to evolve white smoke of ammonium chloride. Until the white smoke of ammonium chloride was not observed, about 24 hours were needed. Then ethyl ether was distilled off under a reduced pressure to obtain viscous semisolid-semiliquid resinous resorcin polysulfide, which was very difficult in handling. Methyl alcohol was added thereto to obtain 20 percent methyl alcohol solution.

160 parts of resorcin was melted in a flask equipped with a reflux condenser by heating at 120° C and 45 parts of 37 percent of formalin was added dropwise thereon over 20 minutes while stirring and then the reaction was continued for further 40 minutes to obtain resorcin excess resorcin-formaldehyde condensate. 100 parts of resorcin excess resorcin-formaldehyde condensate was added to 100 parts of the above described methyl alcohol solution and from the resulting mixture methyl alcohol was completely removed under a reduced pressure to obtain orangy yellow clear homogeneous liquid adhesive base. The liquid adhesive base contained 11.0 percent of water. This liquid was a fluid having a viscosity of about 460 poises at 25° C, which was easy in the handling, and did not show any variation after left to stand in air for more than 6 months.

The, 15 percent of RFL having the following composition was prepared and aged for 48 hours.

| | Part |
|---|---|
| Resorcin | 11.0 |
| 37% formalin | 16.2 |
| 28% ammonium hydroxide | 10.0 |
| Gentac latex* | 244.0 |
| Water | 519.0 |

* made by U.S.A. General Tire and Rubber Co. vinyl pyridine-styrene-butadiene copolymer rubber latex, concentration 41%.

100 parts of the liquid adhesive base prepared as described above was added to a solution obtained by diluting 40 parts of 28 percent of ammonium hydroxide in 526 parts of water and this liquid adhesive base was immediately dissolved in the aqueous ammonium hydroxide solution to form a homogeneous liquid. 100 parts of the thus resulting liquid was mixed with 100 parts of the above described RFL to prepare a liquid adhesive.

A circular polyethylene terephthalate mono-filament having 1,000 deniers was immersed in the above described liquid adhesive and then dried and heat-treated in air atmosphere kept at 238° C for 2.5 minutes. The thus treated filament, after the measurement, deposited 5.0 parts based on 100 parts of the filament of the adhesive component. The treated filament was embedded near the surface of unvulcanized compounded rubber composition sheet and the vulcanization was effected at 150° C for 20 minutes under a pressure of 80 Kg/cm². The cross-section of the resulting vulcanized product is shown in FIG. 1, wherein 1 shows the mono-filament having a large curvature radius, 2 the adhesive, 3 the rubber and 4 shows the curvature radius of the cross-section of the mono-filiment. The mono-filiment 1 and the rubber 3 are adhered tightly by the adhesive 2 interposed between them.

The mono-filament was dug out from the vulcanized rubber and peeled at a rate of 30 cm/min and the resistance to peeling force was determined. This resistance to peeling force is referred to as "adhesion" hereinafter. The adhesion in the above treated monofilament was 1.5 Kg.

The compounded rubber to be used for the adhesion had the following composition.

|  | Part by weight |
|---|---|
| Natural rubber | 80 |
| Styrene-butadiene copolymer rubber | 20 |
| Carbon black | 40 |
| Stearic acid | 2 |
| Petroleum series softener | 10 |
| Pine tar | 4 |
| Zinc white | 5 |
| N-phenyl-β-naphthyl amine | 1.5 |
| 2-benzothiazolyl disulfide | 0.75 |
| Diphenyl guanidine | 0.75 |
| Sulfur | 2.5 |

EXAMPLE 2

A rectangular polyethylene terephthalate mono-filament of 0.45mm × 0.18mm having 1,000 deniers was made a test in the same manner as described in Example 1 and the adhesion was 1.8 Kg.

As the comparative example, the above described mono-filament was subjected to the two step treatments as described in the above cited Japanese Patent No. 486,096. Namely, the mono-filament was immersed in 10 percent aqueous solution of Epikote 812 (epoxy resin, made by Shell Chemical Corp. Trademark) and dried at 163° C for 3 minutes and then immersed in RFL having the following composition and dried at 163° C for 3 minutes. The adhesion in this case was 0.2 Kg.

| Composition of RFL | Part by weight |
|---|---|
| SBR latex (solid content: 40%) (75/25 butadiene/styrene rubbery copolymer) | 100 |
| Resorcinol | 10.93 |
| Formaldehyde (37%) | 5.23 |
| Sodium hydroxide (10%) | 1.35 |
| Sodium dimethyldithiocarbamate (41%) | 3.52 |
| Water | a sufficient amount to make the solid content 20%. |

EXAMPLE 3

Circular polyethylene terephthalate mono-filaments having 1,000 deniers were twisted in a cable twist of 10 turns/10 cm and a ply twist of 11 turn/10 cm to 1,000 deniers//2/3. The resulting cord was tested in the same manner as described in Example 1 and the adhesion was 4.3 Kg. On the other hand, the adhesion, after this cord was treated with the comparative process as described in Example 2 and dried, was 0.5 Kg.

EXAMPLE 4

A circular nylon-6 mono-filament having 1,100 deniers was immersed in a liquid adhesive shown in Example 1 and then preliminarily dried in air atmosphere at 210° C for 3 minutes and then dried and heat-treated in air atmosphere kept at 210° C for 1 minute. The adhesion of the thus treated mono-filament was 1.4 Kg.

Then an elliptic nylon-6 mono-filament having 1,100 deniers was tested in the same manner as described in Example 1 and the adhesion was 1.6 Kg.

EXAMPLE 5

A diaxially stretched polyethylene terephthalate film having a gauge of 0.1 mm was immersed in a liquid adhesive shown in Example 1 and then dried and heat-treated in air atmosphere kept at 240° C for 2 minutes. The liquid adhesive was dispersed uniformly on a film. The thus treated filament was embedded in the unvulcanized rubber composition sheet and the rubber was vulcanized at 150° C for 20 minutes under a pressure. The cross-section of the resulting vulcanized product is shown in FIG. 2, wherein 1 shows the film, 2 the adhesive and 3 shows the rubber. The film 1 and the rubber 3 are adhered tightly by the adhesive 2 interposed between the film and the rubber. The resistance to peeling force was measured by peeling the film having a width of 2.54 cm (1 inch) from the vulcanized product. The resistance to peeling force (adhesion) was 9.9 Kg/cm (25 Kg/inch).

EXAMPLE 6

A diaxially stretched nylon 6 film having a gauge of 0.1 mm was immersed in a liquid adhesive shown in Example 1 and then dried and heat-treated in air atmosphere kept at 205° C for 3 minutes. The treated film was embedded between unvulcanized rubber composition sheets and the rubber was vulcanized at 150° C for 20 minutes under a pressure of 80 Kg/cm². The adhesion was 12.4 Kg/cm (26 Kg/inch), when it was measured in the same manner as described in Example 5.

As a comparative example, the same film was immersed only in RFL of a concentration of 20 percent having the following composition and dried. The adhesion was 0.6 Kg/cm (1.5 Kg/inch).

|  | Part by weight |
|---|---|
| Resorcin | 11.0 |
| 37% formaldehyde | 16.2 |
| 28% ammonium hydroxide | 10.0 |
| Gentac latex | 342.0 |
| Water | 519.0 |

EXAMPLE 7

Polyvinyl alcohol film having a gauge of 0.075 mm was immersed in the liquid adhesive as shown in Example 1 and heat-treated in air atmosphere kept at 220° C for 3 minutes. The thus treated film was embedded between unvulcanized rubber composition sheets and vulcanized at 150° C for 20 minutes under a pressure of 80 Kg/cm². The resistance to peeling force was measured by peeling the film having a width of 2.54 cm (1 inch) from the vulcanized product and it was 9.1 Kg/cm (23 Kg/inch).

EXAMPLE 8

A circular polyvinyl alcohol mono-filament having 500 deniers was immersed in the liquid adhesive as shown in Example 1 and primarily dried in air atmosphere kept at 120° C for 3 minutes and then dried and heat-treated in air atmosphere kept at 220° C for 2 minutes. The adhesion of the treated filament was 1.1 kg.

EXAMPLE 9

A flat rayon mono-filament having 4,000 deniers was immersed in the liquid adhesive as shown in Example 1 and then primarily dried in air atmosphere kept at 140° C for 3 minutes and dried and heat-treated in air atmosphere kept at 190° C for 2 minutes. The adhesion of the treated filament was 3.8 Kg.

What is claimed is:

1. A rubber laminate comprising
vulcanized rubber having embedded therein a material selected from the group consisting of an organic polymeric mono-filament having more than 10 deniers, a cord formed by twisting a plurality of said organic polymeric mono-filaments and a film of an organic polymer to which material has been applied an aqueous adhesive which comprises a mixture of a liquid adhesive base (I) and an aqueous solution of resorcin-formaldehyde-latex (II), the total solids concentration of said aqueous adhesive being 1 to 25 percent by weight and, the weight ratio of the solids content of solid liquid adhesive base (I) to said solution of resorcin-formaldehyde-latex being 1.0:0.5 to 1.0:10.0 wherein said liquid adhesive base consists essentially of a solution of a polyhydric phenol polysulfide having the general formula

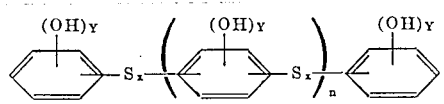

wherein $x$ represents an integer of 2 to 8 and x in each $S_x$ is not always the same integer, Y is an integer of 2 to 3 and $n$ is 0 or an integer from 1 to 15, dissolved in a resorcin excess resorcin-formaldehyde condensate obtained by reacting resorcin with formaldehyde in a mole ratio of 1.0:0.10 to 1.0:0.75, the weight ratio of said polyhydric phenol polysulfide to said resorcin excess resorcin-formaldehyde condensate being 0.5:100 to 100:100, and where said aqueous solution of resorcin-formaldehyde-latex contains a resorcin-formaldehyde resin obtained by reacting resorcin and formaldehyde in a mole ratio of 1.0:1.0 to 1.0:7.0 and a rubber latex, the weight ratio of the solids content of the resorcin-formaldehyde resin to rubber latex being 1:100 to 35:100.

2. A process of producing a rubber laminate comprising immersing a material selected from the group consisting of an organic polymeric mono-filament having more than 10 deniers, a cord formed by twisting a plurality of said organic polymeric mono-filaments and a film of an organic polymer in an aqueous adhesive which comprises a mixture of a liquid adhesive base (I) and an aqueous solution of resorcin-formaldehyde-latex (II), the total solids concentration of said aqueous adhesive being 1 to 25 percent by weight and, the weight ratio of the solids content of solid liquid adhesive base (I) to said solution of resorcin-formaldehyde-latex being 1.0:0.5 to 1.0:10.0 wherein said liquid adhesive base consists essentially of a solution of a polyhydric phenol polysulfide having the general formula

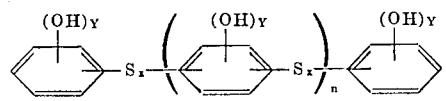

wherein $x$ represents an integer of 2 to 8 and $x$ in each $S_x$ is not always the same integer, Y is an integer of 2 to 3 and $n$ is 0 or an integer from 1 to 15, dissolved in a resorcin excess resorcin-formaldehyde condensate obtained by reacting resorcin with formaldehyde in a mole ratio of 1.0:10 to 1.0:0.75, the weight ratio of said polyhydric phenol polysulfide to said resorcin excess resorcin-formaldehyde condensate being 0.5:100 to 100:100, and where said aqueous solution of resorcin-formaldehyde-latex contains a resorcin-formaldehyde resin obtained by reacting resorcin and formaldehyde in a mole ratio of 1.0:1.0 to 1.0:7.0 and a rubber latex, the weight ratio of the solids content of the resorcin-formaldehyde resin to rubber latex being 1:100 to 35:100, embedding said material in a rubber and then vulcanizing said rubber.

* * * * *